United States Patent [19]

Gainer et al.

[11] 4,359,394

[45] Nov. 16, 1982

[54] THERMALLY STABLE LUBRICANTS FOR REFRIGERATOR SYSTEMS

[75] Inventors: Gordon C. Gainer, Pittsburgh; Russell M. Luck, Monroeville, both of Pa.; Hendrie J. Grant, St. Paul, Minn.

[73] Assignee: Thermo King Corporation, Minneapolis, Minn.

[21] Appl. No.: 150,484

[22] Filed: May 16, 1980

Related U.S. Application Data

[63] Continuation of Ser. No. 956,124, Oct. 30, 1978, abandoned, which is a continuation of Ser. No. 334,328, Feb. 21, 1972, abandoned, which is a continuation-in-part of Ser. No. 144,224, May 17, 1971, abandoned.

[51] Int. Cl.$^3$ .............................................. C10M 1/30
[52] U.S. Cl. ........................................ 252/54; 252/58; 252/68
[58] Field of Search ................ 252/54, 58, 68; 62/193

[56] References Cited

U.S. PATENT DOCUMENTS

| | | | |
|---|---|---|---|
| 1,986,651 | 1/1935 | Prutton | 252/58 |
| 2,051,744 | 8/1936 | Prutton | 252/58 |
| 2,738,657 | 3/1956 | Jacobs | 62/193 |
| 2,824,061 | 2/1958 | Davidson et al. | 252/68 |
| 2,943,057 | 6/1960 | Eiseman | 252/68 |
| 3,391,195 | 7/1968 | Blake et al. | 252/54 |
| 3,432,436 | 3/1969 | Nail | 252/54 |
| 3,458,443 | 7/1969 | Shepherd | 252/68 |
| 3,481,863 | 12/1969 | Donaldson et al. | 208/210 |
| 3,499,840 | 3/1970 | Williams | 252/54 |
| 3,715,302 | 2/1973 | Mills et al. | 252/68 |

*Primary Examiner*—Edward A. Miller
*Attorney, Agent, or Firm*—D. P. Cillo

[57] ABSTRACT

Refrigeration systems comprising a chemically and thermally stable lubricating composition having high lubricity under all operating conditions comprising (a) fluorochlorocarbon refrigerant, (b) hydrofined base oils, alkylated aromatics or refrigerator oils and (c) selected chlorinated fluorinated and/or fluoralkylated aromatics including unsubstituted and alkyl substituted chlorinated biphenyls, chlorinated polyphenyls, and chlorinated diphenyl ethers, and particularly dodecyl-monochlorodiphenyloxide.

5 Claims, No Drawings

THERMALLY STABLE LUBRICANTS FOR REFRIGERATOR SYSTEMS

CROSS REFERENCE TO RELATED APPLICATION

This is a continuation of application Ser. No. 956,124, filed Oct. 30, 1978, which was a continuation of Ser. No. 334,328, filed Feb. 21, 1972, which was a continuation-in-part of Ser. No. 144,224, filed May 17, 1971, all now abandoned.

The present invention relates to novel lubricating compositions for use in compressor refrigerant systems and, in particular, to lubricating compositions having high lubricity which are thermally and chemically stable in the presence of partially or completely fluorinated halocarbon refrigerants.

Refrigerant systems utilizing fluorocarbon refrigerants such as dichlorodifluoromethane (R-12) and chlorodifluoromethane (R-22) require specialized lubricants. Such systems may include not only food refrigerators, but home air conditioners and heat pumps, which in winter operate by extracting heat from cold outdoors air. These lubricants must be resistant to thermal and chemical decomposition at high temperatures present during gas compression, in the presence of fluorocarbons and provide adequate lubrication of bearings and piston-cylinder surfaces at cold start-up. For an exhaustive review of the lubrication requirements of refrigeration compressors and systems, definitions of terms and review of the art, see Guide & Data Book, Systems, Am. Soc. of Heating, Refrig. & Air Conduit. Engineers, Chap. 30 pp. 435-58 (1970 Ed.). The term "fluorocarbon" as employed here generally refers to hydrocarbon compounds having fluorine and chlorine atoms substituted for a high proportion or all of the monovalent hydrogen atoms or carbon.

At low temperature, fluorocarbon refrigerants are highly soluble in the lubricating oils, and depending on the paticular fluorocarbon and the temperature, separation occurs into two phases, one of high fluorocarbon content and the other high in oil and low in fluorocarbon. During cold operation or during the cold-cycle, poor lubrication which may occur causes high cylinder and bearing wear which may be accompanied by galling and seizing. This in part is caused by the condensation of the refrigerant in the crank case in cold atmospheric environment so that the lubricant is diluted with refrigerant. During start-up and with reduced pressure being applied the lubricant is swelled with gaseous refrigerant, as the liquid fluorocarbon boils to produce a foam, making it extremely difficult to pump through the galleries and crank shaft bearings. This is aggravated when R-22 refrigerant is used because phase separation of the liquid refrigerant and lubricant occurs and a highly diluted oil-froth emulsion and foam of very low viscosity is delivered to the bearings and cylinder walls. After start-up, the refrigerant in the oil progressively changes to the vapor phase or boils away from the oil, and the lubrication improves to the required degree.

It is also well known that fluorocarbon refrigerants chemically attack the lubricants and metals, particularly at high temperatures. "Coking" or carbonization in the region of and on the hot discharge valves results from the thermal decomposition of lubricating oil vapor and mist in the presence of hot compressed refrigerant. It is believed that this is caused by the more unstable organic compounds in the oil, such as the hydrocarbons containing sulfur, nitrogen and oxygen, which remain after refining and which impart lubricity to the highly refined refrigerating oils.

Prutton U.S. Pat. No. 1,986,651 teaches that mineral oil base lubricants may be combined, up to 20% of their weight, with a halogenated carbon ring compound, for example, chlor-diphenyls, to produce lubricants particularly for use in internal combustion engines. This patent states that the oil-halogenated compound mixtures are notably useful in cold weather. The viscosity of the mixture determines the type and amount of the halogenated compound to be so admixed.

In a subsequent patent, namely U.S. Pat. No. 2,051,744, Prutton taught the addition to a mineral oil lubricant of a halogenated carbon ring or carbon chain compound having a boiling point above 140° C. These mixtures are disclosed as being primarily for internal combustion engines, with valve lubrication benefitted as compared to use of the mineral oil lubricant alone. This mixture is stated to enable the pressure range at bearing surfaces to be extended before scoring or seizing occurs, and the coefficient of friction is reduced.

Neither of the Prutton patents discloses any refrigerator application, where highly volatile fluorocarbon refrigerants are present. In refrigerators of the compression type, high temperatures are present and even relatively miniscule thermal and chemical decomposition will produce gums and resins that will plug up the capillaries through which the liquid refrigerant must pass in controlled amounts. In an internal combustion engine, thermal stability requirements are far less important than in a refrigerator unit.

It has been proposed to add a stabilizer to the oil-fluorocarbon refrigerant in a compressor refrigerator, in order to prevent so-called "copper plating" from taking place. Under some conditions of operation, the fluorocarbon refrigerant dissolves small amounts of copper, which copper is redeposited on the pistons, cylinders and valves of the compressor unit. Eiseman U.S. Pat. No. 2,943,057 discloses one such stabilizer which comprises certain polymeric materials. There is no suggestion in the patent of any additive for stabilizing the oil itself against thermal and chemical decomposition. Copper plating is a phenomenon entirely distinct from thermal and chemical degradation of oil.

In order to enhance the thermal stability and to minimize decomposition of oil lubricants to be used in a compressor refrigerator system, it is a practice to employ highly refined mineral oils from which sulfur, nitrogen and oxygen compounds have been rather completely eliminated. These highly refined oils when employed in a refrigerator system in working relation with fluorocarbon refrigerants do exhibit high thermal stability and high resistance to coking. However, the lubrication characteristics of these highly refined oils are significantly inferior to the original base stocks. When compounded with conventional lubrication improving additives, such as anti-wear or high pressure additives, the highly refined oils show better lubrication properties, but thermal stability is degraded.

SUMMARY OF THE INVENTION

The present invention comprises a fluorocarbon refrigerant system employing a novel lubricating composition which overcomes these problems. Specifically, a lubricating composition is provided that has greatly enhanced boundary lubricating ability during cold startup with R-12 and R-22 fluorocarbons, in particular, as well as increased thermal and chemical stability and resistance to coking in the presence of fluorocarbon refrigerants during normal operating conditions, comprising an oil and a liquid aromatic compound having at least one benzene ring in which at least one of the ring hydrogens is substituted with at least one substituent selected from the group consisting of chlorine, fluorine and fluorinated alkyl groups.

Outstanding results have been obtained when the lubricant composition is (1) a highly stable hydrofined mineral oil base stock (such as produced by high pressure hydrogeneration of oil in the presence of catalysts at high temperature) or a polyalkylated benzene synthetic lubricant base, and (2) a minor proportion of chlorinated, fluorinated and/or fluoralkylated aromatic compounds including the chlorinated and/or fluorinated biphenyls and chlorinated and/or fluorinated diphenyl ethers, and alkyl derivatives thereof, particularly the chloro substituted compounds. Additionally, commercially available refrigerant system oils, which are highly refined petroleum products such for example as those sold as Suniso ® 3CS (Sun Oil Co.) and Texas Capella ® B (Texaco Inc.) brand oils can be modified by the addition of the above described aromatics including the chlorinated biphenyls and chlorinated diphenyl ethers and alkyl derivatives thereof with improved results.

For ecological reasons, it is desirable that the chlorinated diphenyls and diphenyl ethers and alkyl derivatives thereof comprise an average of one chlorine atom attached to either ring, and that an average of a single alkyl group per molecule, from 8 to 24 carbon atoms, either straight chain or branched, be attached to either phenyl group. Such monoalkyl monochloro diphenyls and diphenyl oxides decompose rapidly into harmless by products when exposed to oxygen and sunlight or other biological conditions. Polychlorinated aryl compounds by contrast are very slow to decompose and are long lived contaminants. Consequently, lubricant compositions of this invention comprising mixtures of highly refined mineral oils or synthetic lubricant bases with monochloromonoalkyl diphenyl or diphenyl oxide can be relatively quickly and safely disposed of.

Outstanding improvements have been realized in thermal stability of the lubricant composition by utilizing a fully hydrofined mineral oil base stock. An example of such class of oils is that group marketed by Atlantic-Richfield (Sinclair Division) as the Tufflo ® Series 6004, 6014 and 6024. Hydrofining is a well known process in the petroleum refining industry. Hydrofined oil base stock has been found to be extremely resistant to thermal degradation in the presence of R-12 or R-22 refrigerants at 175° C. and is thus particularly well suited as the oil base of the present invention. The thermal stability of the hydrofined oils is believed to result largely from the removal of practically all of the remaining amounts of hydrocarbons containing nitrogen, sulfur and oxygen, and the unsaturated hydrocarbons usually found in commercial refrigerator compressor oils. While these fully hydrofined oils provide excellent thermal stability, they have poor lubricating qualities. It has been noted that these mineral oil base stocks do exhibit superior lubricating properties in the presence of fluorocarbon refrigerants dissolved therein, but the refrigerant is a "fleeting" lubricant additive. As indicated previously, as the temperature rises in the refrigerating system, the fluorocarbon is less soluble in the base oil and evaporates and thus leaves the oil which by itself is without adequate lubricity in the compressor of the system. Accordingly, these mineral base oils alone are considered unsatisfactory as lubricants for fluorocarbon refrigerant systems.

In practicing the present invention, good results have been obtained with fully hydrofined mineral oils which have properties and compositions similar to the Tufflo ® brand of oil, series 6004 and 6014. Also quite suitable for use in the invention is a class of synthetic lubricants which comprises polybutenes which are butylene polymers composed mostly of high molecular weight polymers of mono-olefins, such as are marketed by the American Oil Company as Syntholube ® H-5.

A further example of mineral oil base stocks found to be quite desirable in producing the lubricant compositions are the refined mineral oils of the following properties and compositions, which are available as MLO-7557 (developed for the United States Government for use in jet aircraft):

TABLE I

| COMPOSITION | % | TEMP. °F. | VISCOSITY |
|---|---|---|---|
| Isoparaffine | 37.6 | 550 | .56 cs. |
| 1-Ring Naphthenes | 23.4 | 210 | 3.32 |
| 2 Ring Naphthenes | 17.2 | 100 | 15.41 |
| 3+-Ring Naphthenes | 21.8 | 0 | 375. |
| Mol. Wt. | 231 | −40 | 3800. |
| Carbons/Molecule | 23.1 | −65 | 25,900. |
| Naphthenic Carbon, | % of total C27 | | |
| | | Pour Point - 70° F. | |
| Methyl Carbon, | % of total C20 | | |
| Methylene Carbon, | % of total C53 | | |
| Nitrogen-, sulfur-, and oxygen-, containing hydrocarbons | 0% | | |

Note: C27, C20 and C53 are used in the trade to indicate the indicated numerical percentage of the carbon atoms in the respective type of carbon compound.

Generally, some of the more important physical properties that the base lubricant should display include a viscosity of from about 100 to 300 SUS at 100° F. and a pour point not greater than −25° F. (It should be noted, however, that the pour point can be increased depending upon the end application of the system as set forth below.) The sulfur content, asphaltenes, and polar compounds are preferably nil. High saturate and high isoparaffin content are desirable. The carbon type proportioning of the oil is also important. For this reason oils with a naphthenic carbon content from about 50–60% and a paraffinic carbon content from 50–40% are particularly suitable in the practice of the invention.

Outstanding results have been obtained by using as the oil component of the lubricant composition certain polyalkylated benzenes of a viscosity at 100° F. of from 150 to 250 SUS. The general formula for these compounds is:

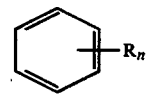

where R represents alkyl groups having an average of from 12 to 20 carbon atoms, either straight chain or branched, and "n" represents a number from 2 to 4. The alkyl groups may be the same or different, and may be attached to different carbon atoms in each successive molecule. These alkylated benzenes usually comprise a mixture of compounds in some of which only a few alkyl groups may be present, while others may have 4 or 5 alkyl groups. Examples of such compounds are the di- and tri- dodecyl benzenes, and di- and tetra-hexadecyl benzenes. Fractional distillation is employed to separate the lower molecular weight products, such as the monoalkyls, then the next fraction separated out will comprise progressively higher substituted compounds, namely those having two or more alkyl groups. The most highly substituted compounds, namely those with five or more groups, will tend to remain in the distillation pot.

These alkylated aromatic fluids of a viscosity at 100° F. of from about 150 SUS to 250 SUS form solutions with the liquid fluorocarbons R-12 and R-22 down to −70° C. At the present time, all other commercially used mineral oils (which are primarily naphthenic in nature) separate into two phases at much higher temperatures.

The combination of the alkylated aromatics of the above defined formulation with a viscosity at 100° F. of between 150 and 250 SUS, and up to 20% of their weight of a monoalkylmonochlorodiphenyl oxide, for example dodecylmonochlorodiphenyl oxide, has given outstanding results in a fluorocarbon refrigerator system under all conditions of use, both at extremely low starting temperatures and severe service for prolonged periods of time.

The well recognized and commercially available antiwear additives used in premium hydraulic and automotive oils such, for example, as tricresyl phosphate esters and the family of zinc dialkyl-aryl dithiophosphates are not particularly advantageous for use in refrigerant systems. When these additives are present the lubricants are vastly inferior, with regard to thermal stability, as compared to the lubricating composition of the present invention.

Liquid aromatics suitable for use in the present invention comprise compounds with at least one benzene ring in which at least one chlorine, fluorine and/or fluorinated alkyl group is substituted for hydrogen. However, because of the instability of monochloromethylbenzene and its high corrosiveness to metal, this compound or in fact any compound with a chloroalkyl group is not suitable for use in refrigerant applications. The liquid aromatics may comprise two or more aromatic (benzene) rings joined directly to each other or through a bivalent radical such as oxygen or methylene, or fused rings such as naphthalene. No other reactive group than the chloro, fluoro and fluorinated alkyl groups may be present on the aromatic nucleus. However, oxygen may be used to bridge two aromatic rings. Two or more of halogen atoms, which in this invention are chlorine and/or fluorine atoms, on the aromatic ring may be present if subsequent disposal of the halogenated aryl compound is not a problem, since polyhalogens are generally more thermally stable than the monohalosubstituted aromatics. Illustrative of these polyhalogenated aromatics are dichlorobenzene, difluorobenzene, monochlorodifluorobenzene, pentachlorodiphenyl oxide, trichlorododecyl biphenyl, 2-chlorobenzotrifluoride and polychloroterphenyl. Mixtures of two or more halogenated aromatics may be employed, for example, 10% by weight of trichlorobenzene and 90% by weight of 48% chlorinated diphenyl oxide. A minimum of about 1% of the halogenated aromatic is needed, excellent results are achieved when about 10% to 20% halogenated aromatics are utilized.

The optimum results from lubricity, thermal and chemical degradation, and ecological viewpoints have been secured by the previously disclosed monoalkylmonochloro diphenyl oxides, and particularly dodecylmonochloro diphenyl oxide, wherein an average of one chlorine atom is attached directly to the benzene ring.

For preparing the compositions of this invention, good results also have been secured with chlorinated biphenyls containing on the average 42% and 48% chlorine by weight, repectively, and available commercially as Aroclor ® 1242 and 1248 marketed by Monsanto Co. They are colorless to yellow tinted mobile oils having a pour point around +2° F. and 19.4° F. (ASTM D97), respectively. They have a specific gravity of 1.380 and 1.445 and a viscosity of 80–93 SUS and 185–240 SUS at 100° F., respectively. They exhibit outstanding chemical and thermal stability in the presence of fluorocarbons, e.g. in Table II, note examples #7 and #8. In fact, their stability is on the order of 10 times (see Table II and compare the R12 values in examples #1 and #2 with #7 and #8) that of typical commercially available refrigerant compressor oils.

Examples of other halogenated and fluoroalkylated aromatics suitable for use in practicing the invention include benzotrifluoride, 2-chlorobenzotrifluoride, 1,3-bis-(trifluoromethyl)-benzene, monochlorodiphenyl oxide, dichlorodiphenyl oxide, trichlorobiphenyl available as MCS 1016 Aroclor ®, and mixtures of two or more.

The halogenated and fluoroalkylated aromatics can be added in widely varying amounts to achieve better lubricity as well as thermal and chemical stability in the higher temperature ranges, with a minimum of about 1% being required for noticeable results. Up to about 20% is the normal upper limit of the halogenated aromatics. The addition of the halogenated aromatics in greater amounts and particularly the higher molecular weight compounds, however, raises the pour point of the composition. Thus, for some refrigerant systems an amount greater than 25% of the weight of the oil would increase the pour point so much that it could be detrimental to the operation of the system. Where a low pour point is not essential, for example, where no part of the system experiences a temperature substantially below ambient, amounts of the halogenated and fluoroalkylated aromatics up to and exceeding 50% are useful. Accordingly, the proportional limitation of the composition is directly related to the pour point requirement of the specific system.

Chlorinated biphenyls and chlorinated diphenyl oxides are not themselves suitable for use as the sole lubricant for refrigerant systems because of their poor viscosity-temperature relationships and high pour point. A viscosity of approximately 150 SUS at 100° F. is generally preferred for the lubricant.

To better understand the nature and advantages of the present invention, numerous comparative tests have been made directed to determine the thermal stability and lubricity of oils and compositions thereof. A perusal of the following non-limiting examples illustrate the present invention.

With regard to thermal and chemical stability, the standard "sealed tube test" has been utilized. This test is described in detail by H. Elsey in "Small Sealed Tube Procedure for Quality Control of Refrigeration Oils", 71 ASHRAE Transactions, Pt. 1, p. 143 (1965). Generally, this test involves introducing equal amounts of oil and refrigerant and samples of the compressor metals employed with which the lubricant and refrigerant come in contact, into a clean, dry glass tube which is sealed and heated to 175° C. and held for a long period of time. These tubes are visually inspected for changes in color and appearance of the metals and deposits. Table II is a table showing thermal aging properties of various oil base stocks, synthetic esters and chlorinated biphenyls:

TABLE II

Thermal Aging Tests (175° C.) on Lube Oil Base Stocks
Rating - Days to Failure

| TEST | OIL | R-12 (DAYS) | R-22 (DAYS) |
|---|---|---|---|
| 1 | Suniso ® 3GS (Sun Oil Co.) | 28-54 | 453 |
| 2 | Texas Capella ® B (Texaco Inc.) | 42-49 | 363 |
| 3 | Neopentyl diester | 28 | 239 |
| 4 | Trimethylol propane triester | 28 | 300 |
| 5 | Pentaerythritol tetra ester | 125 | 300 |
| 6 | Dipentaerythritol | 90 | 49 |
| 7 | 42% chlorinated biphenyl | 363 | 453 |
| 8 | 48% chlorinated biphenyl | 363 | 453 |
| 9 | Super Refined Hydrocarbon Oil | 28 | 300 |
| 10 | Super Refined Mineral Oil (MLO 7557) | 239 | 453 |
| 11 | Hydrofined Naphthenic Oil (Tufflo ® 6004) | 259 | 453+ |
| 12 | Hydrofined Naphthenic Oil (Tufflo ® 6014) | 238 | 453+ |
| 13 | Hydrofined Naphthenic Oil (Tufflo ® 6024) | 104 | 453+ |
| 14 | Hydrofined Paraffinic Oil** (Tufflo ® 6016) | 364 | 453+ |
| 15 | Hydrofined Paraffinic Oil** (Tufflo ® 6026) | 364 | 453+ |
| 16 | Suniso ® 3GS + tricresylphosphate (1%) (anti-wear additive) | 8 | 8 |
| 17 | Suniso ® 3GS + 1% Zinc dialkyldithiophosphate (anti-wear additive) | 8 | 8 |

**While these base stocks provide excellent thermal aging results, their pour point is generally considered too high.

Thus, Table II shows the resistance to thermal aging of both the chlorinated biphenyls and mineral oil base stocks in the presence of the R-12 and R-22 fluorocarbon refrigerant. Particular attention is directed to tests 16 and 17, wherein 1% of anti-wear additives to the oil of test 1 catastrophically degrades the thermal properties of the oil.

It was found that the composition comprising the halogenated aromatic in an oil lubricant continues to provide lubricity to the system even after the base oil has thermally aged. Greatly improved wear properties are obtained with the lubricating compositions of the present invention. To demonstrate this, the lubricants were subjected to rigorous testing on the Falex Tester. See, "Falex Lubricant Testing Machine" Instructor Manual issued by Faville-Le Valley Corp., 1129 Bellwood Avenue, Bellwood, Illinois. Generally, the Falex wear test is made by applying a known load to two self-aligning V-blocks that squeeze a small rotating shaft. In testing, a new test piece is broken-in at about 50 pounds (gauge) for 10 minutes followed by a 200 pound (gauge) run for 5 minutes. A load of 250 pounds (gauge) is applied for the duration of the test which is approximately 4 hours. A 250 pound (gauge) corresponds to about 15,000-20,000 psi on the projected wear area and represents a very severe test for boundary lubricating ability. Any wear which occurs on the test pieces is reflected by a drop in the applied load as indicated on the gauge. Thus, every fifteen minutes the gauge is readjusted to 250 pounds and the take-up is recorded on a calibrated wheel as wear units. The wear in the following table is expressed as "wear units per hour" and represents the total number of units recorded over a four hour period divided by four. The lower the wear value the better the lubricity. For practical purposes, wear rates of from 0 to 4 per hour are essentially equivalent because the wear is so little that it is difficult to measure, and differences often are due to errors in measurement.

Table III is illustrative of the present invention utilizing mineral oils, such as Tufflo ® series 6004 and 6014, and a polybutene such as Syntholube ® H-5 with the indicated halogenated aromatics in the designated amounts:

TABLE III

Falex Wear Tests on Refined Oils Plus Lubricity Additives (250 lb. ga. load, 4 hr. test)

| TEST | LUBRICANT COMPOSITION | DURATION | WEAR (UNITS/HR) |
|---|---|---|---|
| 1 | Tufflo ® 6004 | Failed in 30 sec. | |
| 2 | Tufflo ® 6004 + 1% of 42%-chlorinated biphenyl | 17 minutes, failed | |
| 3 | Tufflo ® 6004 + 2.5% of 42%-chlorinated biphenyl | 240 minutes | 48.5/hr. |
| 4 | Tufflo ® 6004 + 5% of 42%-chlorinated biphenyl | 240 minutes | 60.0/hr. |
| 5 | Tufflo ® 6004 + 7.5% of 42%-chlorinated biphenyl | 240 minutes | 34.0/hr. |
| 6 | Tufflo ® 6004 + 10% of 42%-chlorinated biphenyl | 240 minutes | 28.5 hr. |
| 7 | Tufflo ® 6004 + R-22 | 240 minutes | 0/hr. |
| 8 | Tufflo ® 6004 + R-22 + 10% of 42%-chlorinated biphenyl | 240 minutes | 1.0/hr. |
| 9 | Tufflo ® 6014 | Failed on break in | |
| 10 | Tufflo ® 6014 + R-22 | 240 minutes | 0/hr. |
| 11 | Tufflo ® 6014 + R-22 + 10% of 42%-chlorinated biphenyl | 240 minutes | 0.75/hr. |
| 12 | Tufflo ® 6014 + 10% of 42%-chlorinated biphenyl | 240 minutes | 16.25/hr. |
| 13 | Syntholube ® H-5 | Failed in 7 minutes | |
| 14 | Syntholube ® H-5 + 10% of 42%-chlorinatd biphenyl | 240 minutes | 23.25/hr. |
| 15 | Tufflo ® 6014 + 2.5% Dodecylmonochloro DPO* | Failed 1 minute | |
| 16 | Tufflo ® 6014 + 5.0% Dodecylmonochloro DPO | 240 minutes | 24/hr. |
| 17 | Tufflo ® 6014 + 7.5% Dodecylmonochloro DPO | 240 minutes | 21.75/hr. |
| 18 | Tufflo ® 6014 + 10% Dodecylmonochloro DPO | 240 minutes | 21/hr. |
| 19 | Tufflo ® 6014 + 10% trichlorobiphenyl + R-22 | 240 minutes | 0/hr. |
| 20 | Tufflo ® 6014 + 10% trichlorobiphenyl | 240 minutes | 29.5/hr** |
| 21 | Tufflo ® 6014 + 10% Monochloro DPO | 240 minutes | 30.5/hr. |
| 22 | Tufflo ® 6014 + 10% Dichloro DPO | 240 minutes | 22./hr. |
| 23 | Tufflo ® 6014 + 10% trichlorobiphenyl | 240 minutes | 25/hr. |
| 24 | Tufflo ® 6014 + 25% trichlorobiphenyl | 240 minutes | 6/hr. |
| 25 | Tufflo ® 6014 + 50% trichlorobiphenyl | 240 minutes | 7.5 hr. |
| 26 | Tufflo ® 6004 + 10% 2-chlorobenzotrifluoride | 165 minutes | Pin Broke |

*DPO indicates diphenyl oxide.
**400 lb. ga. load

Additionally, Table IV illustrates the greatly improved wear resistance of commercially available refrigerator oils when modified as set forth herein. In this case, the tests were made using a premium brand refrigerator oil, Suniso ® 30S, and certain halogenated aromatics or other wear additives. As a comparison, the tests also included a premium grade motor oil and an automotive hypoid gear oil neither of which can be used in refrigerant systems. The table shows that lubricating composition of the present invention exhibits extremely good lubricating quality comparable to highest quality non-refrigerant oils.

TABLE IV

Falex Tests on Selected Oils
(250# ga. load, 4 hr. test)

| TEST | LUBRICANT COMPOSITION | DURATION (240 min.) | WEAR (UNITS/HR.) |
|---|---|---|---|
| 1 | Suniso ® 3GS | 74 min. | Failed-Broke Shear Pin |
| 2 | Suniso ® 3GS + 10% of 42%-chlorinated biphenyl | 240 min. | 30.4/hr. |
| 3 | Suniso ® 3GS + 10% of 48%-chlorinated biphenyl | 240 min. | 21.5 hr. |
| 4 | Suniso ® 3GS + R-22 | 240 min. | 3.5/hr. |
| 5 | Suniso ® 3GS + R-12 | 240 min. | 0/hr. |
| 6 | Suniso ® 3GS + 10% Aroclor ® 1242 and R-22 | 240 min. | 0/hr. |
| 7 | Suniso ® 3GS + 1.5% Tricresyl phosphate (TCP) | 240 min. | 2/hr. |
| 8 | GE Compressor Oil WS 98X-292-with TCP | 240 min. | 2.5/hr. |
| 9 | Suniso ® 3GS + 10% 4-Chlorobenzotrifluoride | 240 min. | 1.75/hr. |
| 10 | Suniso ® 3GS + 10% 2-chlorobenzotrifluoride | 240 min. | 1/hr. |
| 11 | Suniso ® 3GS + 10% benzotrifluoride | 240 Min. | 6.25/hr. |
| 12 | Suniso ® 3GS + R-12 | 240 min. | 0/hr. |
| 13 | Suniso ® 3GS + 10% of trichlorobiphenyl + R-22 | 240 min. | 1/hr. |
| 14 | Suniso ® 3GS + 50% of trichlorobiphenyl | 240 min. | 13.25/hr. |
| 15 | Suniso ® 3GS + 1% Lubrizol 1097* | 240 min. | 14.8/hr. |
| 16 | Suniso ® 3GS + 1% Lubrizol 1395* | 240 min. | 4.9/hr. |
| 17 | Gulfpride ® single G Motor Oil | 240 min. | 0/hr. |
| 18 | Esso GX90 Hypoid Gear Oil | 240 min. | 3.5/hr. |

*The Lubrizols are zinc dithio compounds used as anti-wear additives.

These tests show the outstanding boundary lubricating properties of the present invention utilizing as a component a high grade refrigerant. It was also found, as mentioned above, and as quantitatively shown in Tables III and IV that R-22 and R-12 impart improved lubricity to the oil. Both of these refrigerants, functioning as "fleeting" additives, have a beneficial effect in improving the lubricating quality of both premium refrigerator oils and also mineral oil base stock with or without additives.

As stated above, the present invention provides a lubricating composition which overcomes the problem associated with cold start-up. The following test illustrates this feature.

The cold start simulating test stand consists of a compressor and motor to drive it, a condenser, a by-pass valve which recirculates the hot gas from the compressor discharge back to the compressor suction at a pressure of approximately 20 to 25 psi and an expansion valve feeding directly into the suction line from the condenser. By adjustment of the expansion valve, a mixture of liquid and vapor is achieved and the suction line and compressor are effectively converted into an evaporator thereby making this portion of the system the coldest portion. When the compressor is stopped a substantial portion of the refrigerant migrates to this cold portion of the system and assumes the liquid state. Upon restarting, loss of oil pressure, as previously described, occurs. By cycling the cold start simulating test stand, 4 minutes with the compressor running and 4 minutes with the compressor stopped, an excellent test is created for evaluating a lubricant's ability to prevent wear in boundary or partial film lubrication under cold start condition.

Table V below shows the wear data obtained using the cold start simulating test with Suniso ® 3GS, and with Suniso ® 3GS+10% of 42% chlorinated biphenyl compare with examples #1 and #2 in Table IV. Of the two bearings referred to in the table the one closest to the oil pump outlet is Brg #4 and the one furthest from the oil pump outlet is Brg #1 respectively. The real improvement demonstrated by the use of 42% chlorinated biphenyl is shown by the wear in the bearing #1 furthest from the pump, since this bearing experiences greater oil starvation and this more closely simulates true boundary lubricating conditions.

TABLE V

| | | Bearing Wear Data | | |
|---|---|---|---|---|
| Item | Oil | Duration | Brg. #1 | Brg. #4 |
| 1 | Suniso ® 3GS | 3000 cycles | 0.00120" | 0.0002" |
| 2 | Suniso ® 3GS + 10% of 42% chlorinated biphenyl | 3000 cycles | 0.00075" | 0.0018" |

The order of magnitude of improvement obtained by using 42% chlorinated biphenyl on the oil is a 40% reduction in wear.

Falex wear tests under three different load conditions were conducted on a polyalkylbenzene having from 2 to 4 alkyl chains per benzene ring, of a viscosity at 100° F. of 150 SUS., without and with various proportions of dodecylmonochlorodiphenyl oxide (DoClDPO).

TABLE VI

Falex Wear Tests-
Pressure 250 lbs. gauge, steel on steel pin and block-
3 hour test. (SAE 1137 pin and SAE 3135 blocks.)

| % Polyalkylbenzene | % DoClDPO | Wear-Units/Hr. |
|---|---|---|
| 100 | — | 23 |
| 95 | 5 | 16 |
| 90 | 10 | 12–13 |
| 85 | 15 | 10 |
| 80 | 20 | 10 |
| 0 | 100 | 7 |
| Pressure 400 lbs. Gauge | | |
| 100 | 0 | N.G. Failed immediately |
| 95 | 5 | 30 |
| 90 | 10 | 27 |
| Pressure 500 lbs. gauge | | |
| 100 | 0 | N.G. Failed immediately |
| 95 | 5 | 30 |
| 90 | 10 | 17 |

Several wear tests were conducted under similar conditions to those of Table VI on Suniso 3GS oil without and with 5 and 10% of dodecylmonochlorodiphenyl oxide and the results were as follows:

TABLE VII

Falex Wear Tests-Pressure 250 lbs. gauge, steel on steel, S.A.E. pin and block, (see Table VI).

| % Suniso 3GS | % Diphenyl oxide | Wear-Units/Hr. |
| --- | --- | --- |
| 100 | 0 | Failed |
| 95 | 5 | 35 |
| 90 | 10 | 14 |

Thermal ageing tests corresponding to those employed in preparing Table II were applied to some of the lubricant compositions of Tables VI and VII with the following results:

TABLE VIII

Tube Test at 175° C. - Days to Failure

| Lubricant | Fluorocarbon R-12 | R-22 |
| --- | --- | --- |
| Suniso 3GS | 35 | 210 (SOT) |
| Polyalkylbenzene | 210 | 210 (SOT) |
| Polyalkylbenzene + 10% DoClDPO | 77 (SOT) | 77 (SOT) |
| DOClDPO | 35 | 245 (SOT) |
| Suniso 3GS + 10% DoClDPO | 35 | 210 (SOT) |

SOT = Still on test
DoClDPO = dodecylmonochlorodiphenyl oxide

The visual evidence on the samples still on test indicates that the oils with DoClDPO with last at least as long as the untreated oils alone so that the DoClDPO additive does not degrade the thermal stability of the oil.

Tests of the critical or consolute temperatures down to which no phase separation occurs in the presence of fluorocarbon R22 in an amount of 20% of the mixture resulted in the following:

TABLE IX

| | Consolute Temperature |
| --- | --- |
| Polyalkyl benzene | less than −70° C. |
| Polyalkyl benzene + 10% DoClDPO | less than −70° C. |
| DoClDPO | less than −70° C. |
| Suniso 3GS | − 6° C. |
| Suniso 3GS + DoClDPO | −10° C. |

Typical lubricating compositions of this invention were tested under actual operating conditions. This test utilized a standard compressor used on an ice cream delivery truck. This unit was continuously operated in a high temperature environment and was used as an endurance testing device. Both Suniso ® 3GS and Suniso ® 3GS+10% of 42% chlorinated biphenyl were used as the lubricant with a standard refrigerant for this application comprising a mixture of 48.0% of R-22 and 51.2% of monochloropentafluoroethane in these tests. The results are tabulated in Table X.

TABLE X

| | Suniso ® 3GS | Suniso ® 3GS + 10% Chlorinated Biphenyl |
| --- | --- | --- |
| Duration | 1819.8 hrs. | 2668.0 hrs. |
| Piston & Sleeve | Slight Scoring | Excellent |
| Discharge Valve | Black Resinous Deposits (Approx. .010 thick) Completely Failed. All overlay gone. | Light to Dark Brown Deposits (Approx. .002 thick) Approx. .0015 wear. Running normally. |
| Bearings | | |
| Crankshaft | Badly scored and worn. Blue from excess heat. | Slight scratches. No significant wear. |

An outstanding improvement attained by incorporating the halogenated aromatic in the lubricant is evidenced by the data in the Table X.

While emphasis has been made on the use of the lubricating compositions in refrigerators, it should be understood that heat pumps, which basically are refrigerators, and similar devices can advantageously employ the lubricant composition of this invention.

We claim as our invention:

1. A compressor refrigeration system employing a fluorocarbon refrigerant, having a lubricant composition in contact with the fluorocarbon refrigerant, the lubricant composition having chemical and thermal stability in the presence of the fluorocarbon refrigerant, the lubricant composition consisting of a thermally stable oil of a viscosity at 100° F. of from 100 to 300 SUS containing from about 5% to about 20% of the weight thereof of a liquid halogenated compound selected from the group consisting of diphenyl ethers and biphenyls and alkyl derivates thereof having at least one halogen substituent selected from the group consisting of chlorine, fluorine and mixtures thereof, the liquid halogenated compound being substantially completely soluble in the oil over the expected temperature range of the refrigeration system, the compound providing for good lubricity in the lubricant composition at cold startup, and at hot compressor operating temperatures while in vapor contact with hot fluorocarbon refrigerant, and the lubricant composition being highly resistant to chemical reaction with the fluorocarbon and/or the materials in the refrigeration system at the expected temperatures and operating conditions of the refrigeration system.

2. The system of claim 1, wherein the liquid halogenated compound is a diphenyl ether with an average of one chlorine group and one alkyl group per molecule, wherein the alkyl group has up to 24 carbon atoms.

3. The system of claim 2, wherein the liquid halogenated compound is dodecylmonochlorodiphenyloxide.

4. The system of claim 1 wherein the oil comprises a polyalkylbenzene compound having the formula

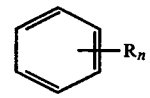

where R represents a hydrocarbon group of from 8 to 24 carbon atoms and n represents from 2 to 4 as an average.

5. The system of claim 1 wherein the oil comprises a highly refined mineral oil having substantially no sulfur, oxygen or nitrogen containing compounds, substantially no olefinically unsaturated compounds and substantially no aromatic compounds, with a pour point of below −25° C.

* * * * *